(12) United States Patent
Breitgand et al.

(10) Patent No.: US 8,086,708 B2
(45) Date of Patent: Dec. 27, 2011

(54) AUTOMATED AND ADAPTIVE THRESHOLD SETTING

(75) Inventors: David Breitgand, Modi'in (IL); Ealan Henis, Rehovot (IL); Onn Shehory, Neve Efra'im (IL)

(73) Assignee: International Business Machines Corporation, Armonk, NY (US)

(*) Notice: Subject to any disclaimer, the term of this patent is extended or adjusted under 35 U.S.C. 154(b) by 1436 days.

(21) Appl. No.: 11/237,295

(22) Filed: Sep. 28, 2005

(65) Prior Publication Data

US 2006/0276995 A1 Dec. 7, 2006

Related U.S. Application Data

(63) Continuation-in-part of application No. 11/146,627, filed on Jun. 7, 2005, now abandoned.

(51) Int. Cl.
*G06F 15/173* (2006.01)
(52) U.S. Cl. .......... 709/223; 709/224
(58) Field of Classification Search .......... 700/108; 375/229; 709/223–224
See application file for complete search history.

(56) References Cited

U.S. PATENT DOCUMENTS

| | | | | |
|---|---|---|---|---|
| 6,789,070 B1* | 9/2004 | Willett et al. | .......... | 706/20 |
| 7,076,695 B2* | 7/2006 | McGee et al. | .......... | 714/47.2 |
| 7,379,999 B1* | 5/2008 | Zhou et al. | .......... | 709/224 |
| 7,496,655 B2* | 2/2009 | Gopalan et al. | .......... | 709/224 |
| 7,613,804 B2* | 11/2009 | Raden et al. | .......... | 709/224 |
| 7,751,325 B2* | 7/2010 | Krishnamurthy et al. | .... | 370/233 |
| 2002/0091985 A1* | 7/2002 | Liebmann et al. | .......... | 716/19 |
| 2003/0208523 A1* | 11/2003 | Gopalan et al. | .......... | 709/201 |
| 2004/0088211 A1* | 5/2004 | Kakouros et al. | .......... | 705/10 |
| 2004/0088406 A1* | 5/2004 | Corley et al. | .......... | 709/224 |
| 2004/0243699 A1* | 12/2004 | Koclanes et al. | .......... | 709/224 |
| 2005/0060295 A1* | 3/2005 | Gould et al. | .......... | 707/3 |
| 2005/0071450 A1* | 3/2005 | Allen et al. | .......... | 709/223 |
| 2005/0096953 A1* | 5/2005 | Washington et al. | .......... | 705/7 |
| 2005/0114174 A1* | 5/2005 | Raden et al. | .......... | 705/2 |
| 2005/0172027 A1* | 8/2005 | Castellanos et al. | .......... | 709/229 |
| 2005/0188075 A1* | 8/2005 | Dias et al. | .......... | 709/224 |
| 2005/0228878 A1* | 10/2005 | Anstey et al. | .......... | 709/224 |
| 2005/0256946 A1* | 11/2005 | Childress et al. | .......... | 709/223 |
| 2006/0064486 A1* | 3/2006 | Baron et al. | .......... | 709/224 |
| 2006/0090163 A1* | 4/2006 | Karisson et al. | .......... | 718/105 |
| 2006/0092850 A1* | 5/2006 | Neidhardt et al. | .......... | 370/252 |
| 2006/0188011 A1* | 8/2006 | Goldszmidt et al. | .......... | 375/229 |
| 2006/0206011 A1* | 9/2006 | Higgins et al. | .......... | 600/300 |
| 2006/0265694 A1* | 11/2006 | Chilimbi et al. | .......... | 717/124 |
| 2010/0218104 A1* | 8/2010 | Lewis | .......... | 715/736 |

OTHER PUBLICATIONS

A Comparison of Novel and State-of-the-Art Polynomial Bayesian Network Learning Algorithms, Laura E. Brown, Loannis Tsamardinos, Constantin F. Aliferis, May 10, 2005.*

* cited by examiner

*Primary Examiner* — Joshua Joo

(57) ABSTRACT

A method for managing a computer system includes monitoring first violations of a service level objective (SLO) of a service running on the computer system so as to determine a first statistical behavior of the first violations. Second violations of a component performance threshold of a component of the computer system are monitored so as to determine a second statistical behavior of the second violations. A model that predicts the second statistical behavior based on the first statistical behavior is produced. The component performance threshold is automatically adjusted responsively to the model, so as to improve a prediction of the first violations by the second violations.

26 Claims, 6 Drawing Sheets

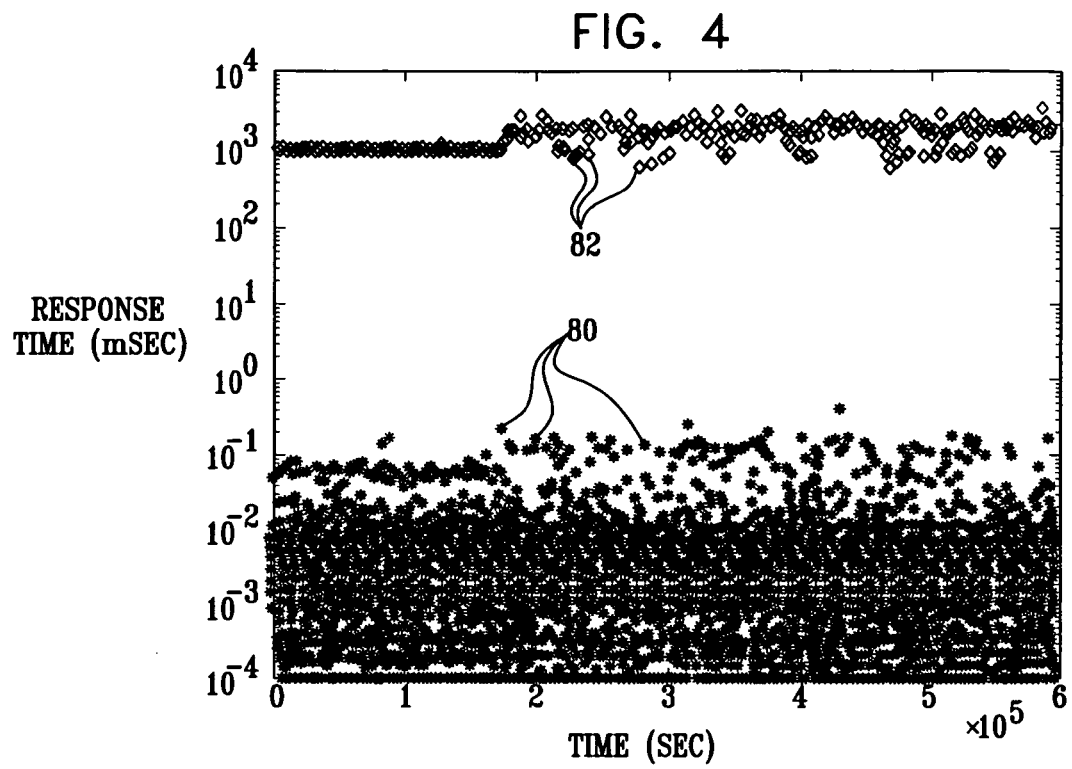
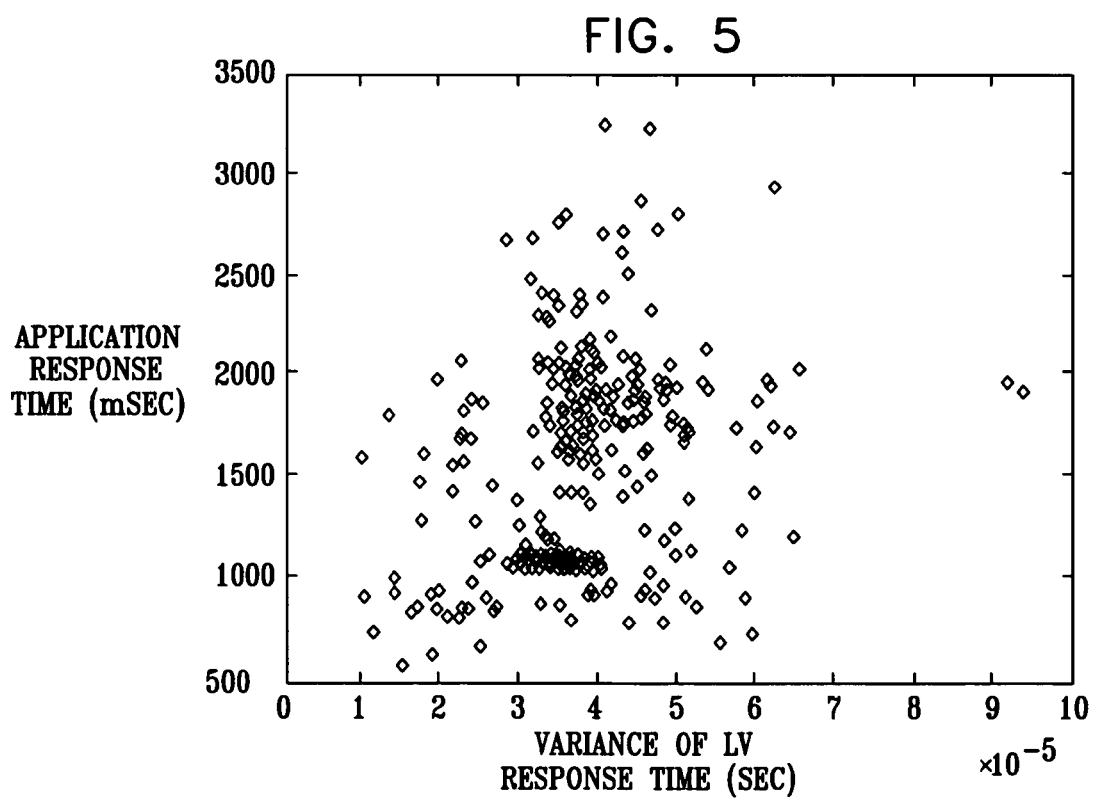

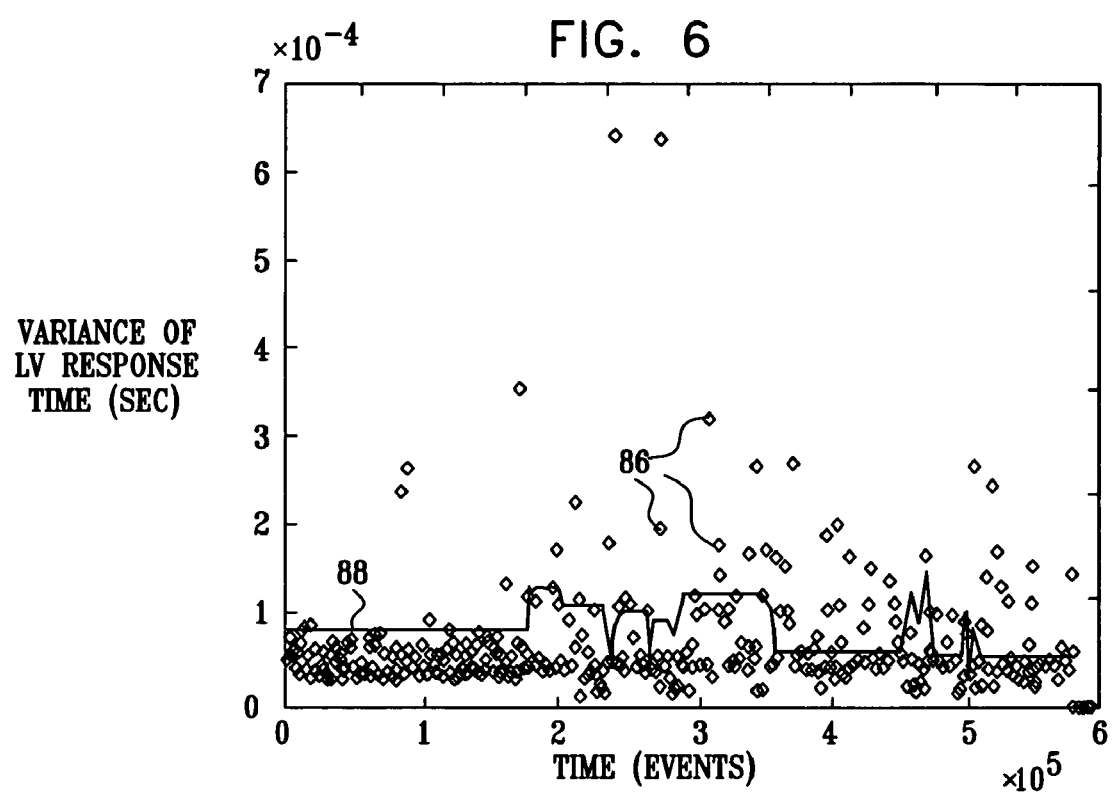

AUTOMATED AND ADAPTIVE THRESHOLD SETTING

CROSS-REFERENCE TO RELATED APPLICATIONS

This application is a continuation in part application of U.S. patent application Ser. No. 11/146627, entitled "Automated and adaptive Threshold setting," filed on Jun. 7, 2005 now abandoned. This application is also related to U.S. patent application Ser. No. 11/088,054, entitled "Root-Cause Analysis of Network Performance Problems," filed on Mar. 23, 2005. These related applications are assigned to the assignee of the present patent application and is incorporated herein by reference.

FIELD OF THE INVENTION

The present invention relates generally to computer system management, and particularly to methods and systems for automated and adaptive setting of system component performance thresholds.

BACKGROUND OF THE INVENTION

Computer systems commonly use performance thresholds for monitoring and managing the performance of system components. Threshold violations are recorded and analyzed as possible indicators of system faults. Various methods for setting and managing component performance thresholds (referred to herein as "component thresholds" for brevity) are known in the art. For example, Hellerstein et al. describe a method for predicting threshold violations in "A Statistical Approach to Predictive Detection," Computer Networks, (35: 1), 2001, pages 77-95, which is incorporated herein by reference. The method models the stationary and non-stationary behavior of threshold metrics and computes the probability of threshold violations. Another use of predictive algorithms for predicting failures in computer systems is described by Vialta et al. in "Predictive Algorithms in the Management of Computer Systems," IBM Systems Journal, (41:3), 2002, pages 461-474, which is incorporated herein by reference.

Another threshold setting method is described by Burgess in "Two-Dimensional Time-Series for Anomaly Detection and Regulation in Adaptive Systems," Proceedings of the Thirteenth IFIP/IEEE International Workshop on Distributed Systems: Operations and Management, Montreal, Canada, October 2002, pages 169-180, which is incorporated herein by reference. The author describes a method in which a two-dimensional time approach is used to classify a periodic, adaptive threshold for service level anomaly detection. The author asserts that the method provides improved storage and computational efficiency.

Agarwal et al. describe yet another threshold scheme in "Problem Determination Using Dependency Graphs and Run-Time Behavior Models," Proceedings of the Fifteenth IFIP/IEEE International Workshop on Distributed Systems: Operations and Management, New York, N.Y., November 2004, pages 171-182, which is incorporated herein by reference. The authors describe a method that uses dependency graphs and dynamic run-time performance characteristics of resources in an IT environment to identify the root cause of reported problems. The method uses the dependency information and the behavior models to narrow down the root cause to a small set of resources that can be individually tested, facilitating quick remediation of the problem.

Hoogenboom and Lepreau describe still another threshold management system in "Computer System Performance Problem Detection Using Time Series Model," Proceedings of the USENIX Summer 1993 Technical Conference, Cincinnati, Ohio, June 1993, pages. 15-32, which is incorporated herein by reference. The authors describe an expert system that automatically sets thresholds, and thus detects and diagnoses performance problems in a network of Unix® computers. The system uses time series models to model the variations in workload on each host.

Some threshold schemes use a statistical model based on the historical behavior of the threshold metric. Such a scheme is described by Brutlag in "Aberrant Behavior Detection in Time Series for Network Monitoring," Proceedings of the Fourteenth USENIX System Administration Conference (LISA 2000), New-Orleans, La., December 2000, pages 139-146, which is incorporated herein by reference. An additional threshold scheme based on a statistical model is described by Hajji et al. in "Detection of Network Faults and Performance Problems," Proceedings of the Internet Conference 2001 (IC 2001), Osaka, Japan, November 2001, pages 159-168, which is incorporated herein by reference. Yet another statistical model is described by Thottan and Ji in "Adaptive Thresholding for Proactive Network Problem Detection," Proceedings of the Third IEEE International Workshop on Systems Management, Newport, Rhode-Island, April 1998, pages 108-116, which is incorporated herein by reference. A further model is described by Ward et al. in "Internet Service Performance Failure Detection," Proceedings of the 1998 Internet Server Performance Workshop, Madison, Wis., June 1998, pages 103-110, which is incorporated herein by reference.

U.S. Pat. No. 6,876,988, whose disclosure is incorporated herein by reference, describes a method and a system for computing a performance forecast for an e-business system or other computer architecture. The system obtains measured input values from a plurality of internal and external data sources to predict the system performance. The system can include both intrinsic and extrinsic variables as predictive inputs. Intrinsic variables include measurements of the system's own performance, such as component activity levels and system response time. Extrinsic variables include other factors, such as the time and date, and demographic factors that may effect or coincide with increased network traffic.

In some applications it is desirable to correlate component thresholds with service-level objectives (SLOs) of the computer system. For example, Cohen et al. describe a system analysis method of this sort in "Correlating Instrumentation Data to System States: A Building Block for Automated Diagnosis and Control," Proceedings of the Sixth USENIX Symposium on Operating Systems Design and Implementation (OSDI '04), San-Francisco, Calif., December 2004, pages 231-244, which is incorporated herein by reference. The method uses Tree-Augmented Bayesian Networks (TANs) to identify combinations of system-level metrics and threshold values that correlate with high-level performance states.

Systems for threshold management and for correlating thresholds with SLOs are produced by Netuitive, Inc. (Reston, Va.). The company produces a software tool called "Netuitive SI" that learns the baseline behavior of a computer system. The tool issues alarms if deviations from the baseline behavior are detected. The company also produces a tool called "Netuitive Service Analyzer" that correlates SLOs with component alarms.

Hellerstein describes a quantitative performance diagnosis (QPD) algorithm, which produces explanations that quantify the impact of problem causes, in "A General Purpose Algorithm for Quantitative Diagnosis of Performance Problems," Journal of Network and Systems Management, (11:2), June 2003, which is incorporated herein by reference.

In "Data-driven Monitoring Design of Service Level and Resource Utilization" 2005 9th IFIP/IEEE Symposium on Integrated Network Management pp. 89-101, Nice, France, May 2005, which is incorporated herein by reference, Perng, Mass., Lin and Thoenen describe a method for optimizing the setting of resource metric thresholds and service level breach point thresholds. Perng et al.'s algorithm is based on maximizing the mutual information of the time series of component and application threshold breaching, which is used to calculate optimized threshold values.

In some cases, machine learning or data mining techniques are used to model the relationship between component thresholds and SLOs. For example, Diao et al. describe methods of this sort in "Generic On-Line Discovery of Quantitative Models for Service Level Management," Proceedings of the Eighth IFIP/IEEE International Symposium on Integrated Network Management, Colorado Springs, Colo., March 2003, pages 157-170, which is incorporated herein by reference. Other methods are described by Hellerstein and Ma in "Mining Event Data for Actionable Patterns," Proceedings of the 26th Computer Management Group (CMG) International Conference, Orlando, Fla., December 2000, pages 307-318, which is incorporated herein by reference.

In other cases, neural networks are used to learn the relationships between measured input values. For example, U.S. Pat. Nos. 6,289,330 and 6,216,119, whose disclosures are incorporated herein by reference, describe neural network systems that receive measured input values during a time trial, combine the information with prior information and learn relationships among the variables gradually by improving the learned relationships from trial to trial.

SUMMARY OF THE INVENTION

Many computer systems are managed using performance thresholds set for the various system components. When managing computer systems, it is often desirable to correlate such component thresholds with application-level service level objectives (SLOs). This correlation enables the system to automatically set statistically-meaningful threshold values that reliably predict system-level problems. An SLO-related setting of the component thresholds redefines the normal and abnormal behavior of system components from the perspective of the applications and the service-related objectives of the computer system. Setting such meaningful values of component-level performance thresholds is a complicated task, especially in computer systems comprising multiple tiers, levels, components and applications having complex interdependencies. In conventional computer systems, component thresholds are often left constant at their default values or set empirically (and therefore sub-optimally) by a system administrator.

Embodiments of the present invention provide methods and systems for automatically and adaptively setting component thresholds, so as to correlate threshold violations and SLO violations with controllable accuracy.

In some embodiments, a threshold management unit monitors and records component threshold violations and SLO violations over time. The threshold management unit uses the collected historical data to construct a predictive model that links together the statistical behaviors of the component threshold violations and the SLO violations.

In some embodiments, the threshold management unit uses the historical data to estimate the rate of false-positive and false-negative threshold violation/satisfaction events with respect to the SLO. Using the predictive model, the threshold management unit adaptively updates the threshold value, so that the measured false-positive and false-negative rates gradually converge to predetermined desired values.

The model uses historical threshold values, paired with the corresponding SLO violation information, to calculate an updated threshold value. In some embodiments, calculating the model comprises fitting the historical data using a logistic regression process, as will be explained below. In some embodiments, the historical data is filtered and/or weighted in order to improve the accuracy of the model and accommodate different workload patterns.

An alternative method for direct setting of the component threshold is also described below.

There is therefore provided, in accordance with an embodiment of the present invention, a method for managing a computer system, including:

monitoring first violations of a service level objective (SLO) of a service running on the computer system so as to determine a first statistical behavior of the first violations;

monitoring second violations of a component performance threshold of a component of the computer system so as to determine a second statistical behavior of the second violations;

producing a model that predicts the second statistical behavior based on the first statistical behavior; and automatically adjusting the component performance threshold responsively to the model, so as to improve a prediction of the first violations by the second violations.

In an embodiment, the computer system includes a Storage Area Network (SAN).

In another embodiment, monitoring the first and second violations includes estimating false-positive and false-negative rates of the second violations with respect to the first violations. Additionally or alternatively, automatically adjusting the threshold includes causing the estimated false-positive and false-negative rates to converge to predetermined target values. Further additionally or alternatively, automatically adjusting the threshold includes searching for a threshold value that minimizes the estimated false-positive and false-negative rates.

In yet another embodiment, producing the model includes fitting a first sequence including historical values of the first violations and a second sequence including historical values of the component performance threshold with a probability of component performance threshold violations, and automatically adjusting the component performance threshold includes calculating an updated threshold value based on the fitted sequences.

Additionally or alternatively, fitting the sequences includes applying at least one of a logistic regression process and a polynomial fitting process. Further additionally or alternatively, producing the model includes estimating a fitting quality responsively to the model and the sequences, and automatically adjusting the threshold includes determining whether to update the threshold responsively to the fitting quality. In some embodiments, fitting the sequences includes inserting dummy data points into the sequences, so as to reduce a bias in the calculated updated threshold value.

In a disclosed embodiment, fitting the sequences includes using only a part of the historical values in the sequences corresponding to at least one of recent events, periodic events, events in which the SLO is almost violated and events in which a performance metric value is within a predetermined interval. Additionally or alternatively, fitting the sequences includes applying weights to at least some of the historical values corresponding to at least one of recent events, periodic events, rare events, events in which the SLO is almost violated and events in which a performance metric value is within a predetermined interval.

There is also provided, in accordance with an embodiment of the present invention, apparatus for managing a computer system, including:

an interface, which is coupled to receive inputs indicative of first violations of a service level objective (SLO) of a service running on the computer system and of second violations of a component performance threshold of a component of the computer system; and a processor, which is arranged to determine a first statistical behavior of the first violations and a second statistical behavior of the second violations, to produce a model that predicts the second statistical behavior based on the first statistical behavior, and to automatically adjust the component performance threshold responsively to the model, so as to improve a prediction of the first violations by the second violations.

There is additionally provided, in accordance with an embodiment of the present invention, a computer software product for managing a computerized system, the product including a computer-readable medium, in which program instructions are stored, which instructions, when read by a computer, cause the computer to monitor first violations of a service level objective (SLO) of a service running on the computerized system so as to determine a first statistical behavior of the first violations, to monitor second violations of a component performance threshold of a component of the computerized system so as to determine a second statistical behavior of the second violations, to produce a model that predicts the second statistical behavior based on the first statistical behavior, and to automatically adjust the component performance threshold responsively to the model, so as to improve a prediction of the first violations by the second violations.

There is also provided, in accordance with an embodiment of the present invention a method for performing an interactive analysis of a computer system to devise an information technology solution applicable to the computer system, the method including:

monitoring first violations of a service level objective (SLO) of a service running on the computer system so as to determine a first statistical behavior of the first violations;

monitoring second violations of a component performance threshold of a component of the computer system so as to determine a second statistical behavior of the second violations;

producing a model that predicts the second statistical behavior based on the first statistical behavior; and automatically adjusting the component performance threshold responsively to the model, so as to improve a prediction of the first violations by the second violations.

The present invention will be more fully understood from the following detailed description of the embodiments thereof, taken together with the drawings in which:

BRIEF DESCRIPTION OF THE DRAWINGS

FIGS. 4 and 5 are plots that schematically illustrate an application metric and component metrics, in accordance with embodiments of the present invention;

FIG. 6 is a plot that schematically illustrates a component metric and a component threshold, in accordance with an embodiment of the present invention;

DETAILED DESCRIPTION OF EMBODIMENTS

System Description

Figure 1:
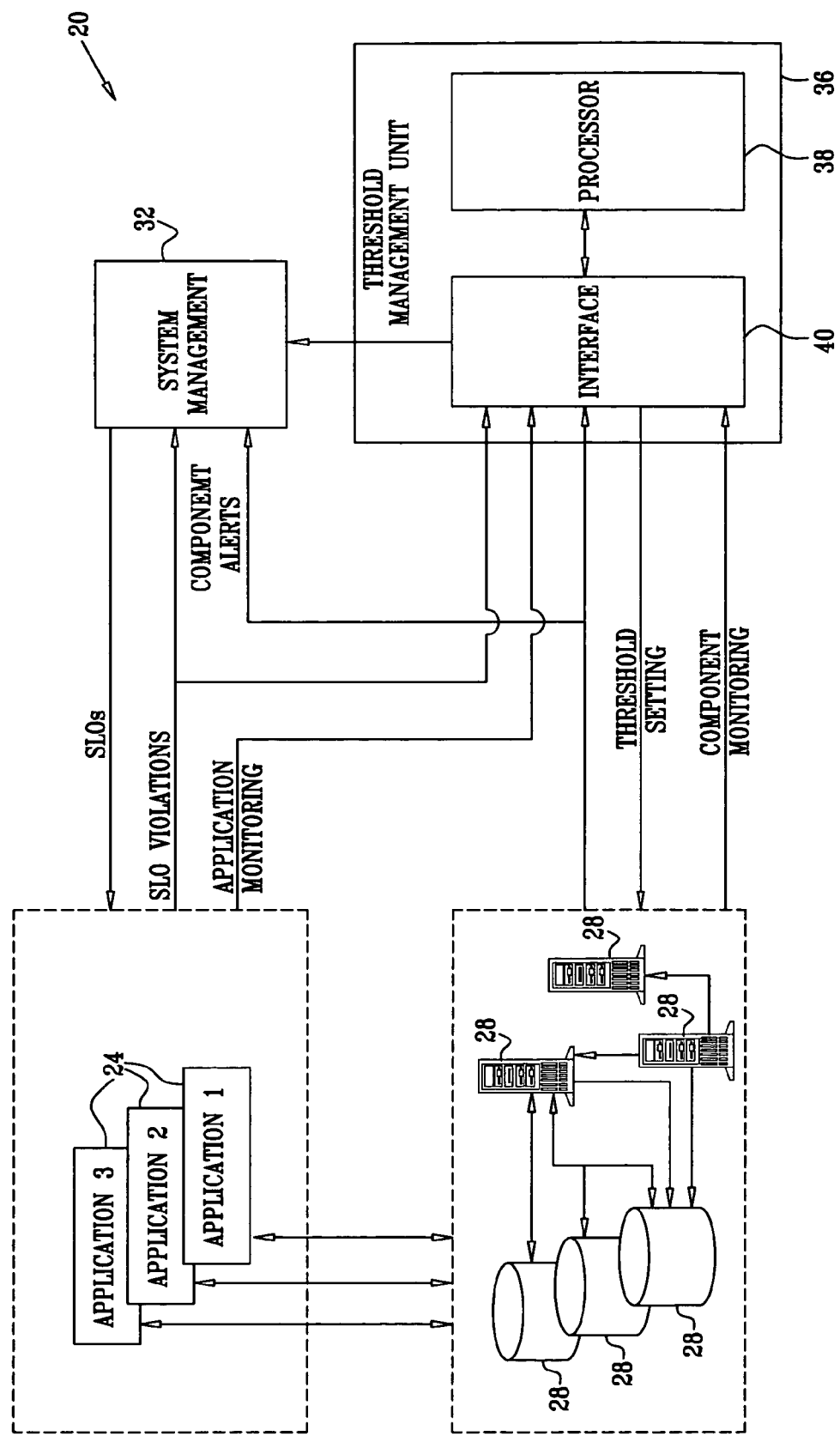
FIG. 1 is a block diagram that schematically illustrates a computer system, in accordance with an embodiment of the present invention.

FIG. 1 is a block diagram that schematically illustrates a computer system 20, in accordance with an embodiment of the present invention. System 20 may comprise, for example, a storage-area network (SAN) that interconnects multiple servers to multiple storage devices. Alternatively, system 20 can comprise an enterprise computer system, an electronic business system, a web-site or any other suitable computer system. In some embodiments, system 20 employs autonomous computing and/or self-management methods, as are known in the art. Software applications 24 run on system components 28. Components 28 may comprise, for example, storage devices such as disks or tapes, disk arrays and their controllers, computing platforms such as servers, and communication devices such as switches and routers. Components 28 are interconnected using suitable interconnection means, such as a backplane or a local area network (LAN), and communicate with each other and with applications 24 using suitable interfaces.

During the operation of the system, some of system components 28 monitor their performance in order to detect abnormal behavior and identify potential problems and malfunctions. In some embodiments, the performance of some system components 28 may be monitored by external means. Typically, component 28 measures and monitors one or more predefined component performance metrics (referred to herein as "component metrics" for brevity). Component metrics may comprise, for example, an access time of a disk, or an instantaneous throughput or a latency of a communication device. For each component metric, the system defines a corresponding component threshold, whose value is set using methods which will be described below. Measured metric values that do not violate the threshold are regarded as normal, whereas metric values that violate the threshold are considered abnormal behavior. (In general, a threshold set over a particular component metric may comprise an upper threshold or a lower threshold. Additionally, some component metrics may have both upper and lower thresholds defined simultaneously. In the context of the present patent application and in the claims, the term "threshold violation" refers to component metric values that are higher than an upper threshold, or to component metric values that are lower than a lower threshold, as applicable.) A threshold violation typically triggers an alert.

Typically, components 28 of system 20 provide and consume services to and from each other. The services are depicted as arrows between the components in FIG. 1. As part of the service definition, components 28 typically have service level agreements (SLAs) defined among them. Part of the SLA is a service level objective (SLO), which defines and quantifies the performance level that a particular component guarantees to other components that may consume its services. In some embodiments, the SLO is expressed as a threshold, which is defined over an application metric. An SLO for a storage service may be, for example, "the response time will not exceed 2 seconds for 95% of the transactions." In this example the response time of the service serves as the application metric. For a communication service, an exemplary SLO may be "the average offered capacity will exceed 100 Mbps, averaged over 5 second intervals." Other SLOs may refer to reliability levels and other parameters.

The descriptions that follow refer mainly to binary SLOs, which can be either satisfied or violated. Some systems, however, define multi-level SLOs, for example in scenarios in which the client pays for a service in accordance with the service level. The methods described below can easily be generalized to the case of multi-level SLOs.

In many practical cases, the term "service" refers to application-level services, each comprising multiple "atomic" or lower-level services, provided by multiple components 28. For example, a storage service may comprise computational and management services provided by a server, as well as atomic storage services provided by one or more storage devices. From the system's point of view, an application-level service is typically regarded as a single entity having predefined service level objectives. In the context of the present patent application and in the claims, the term "service" refers to both low-level and application-level services. The term "SLO" refers to the corresponding application-level SLO. Typically, SLO violations are detected and reported by applications 24 or by their users.

A system management module 32 defines (or is supplied with) the SLOs for the different services. Module 32 monitors the application-level SLO violations reported by applications 24. Module 32 also monitors the alerts triggered by components 28 in response to component threshold violations. Module 32 may collect and analyze data, react upon it, produce reports, interact with a system administrator and/or perform any other system management functions known in the art. System management module 32 may be implemented as a software process running on one of the servers of system 20, or on a separate computing platform.

A threshold management unit 36 monitors the operation of system components 28 and of applications 24. Unit 36 comprises a processor 38 that performs the various threshold management functions described herein, and an interface 40 that communicates with the different applications and components of system 20. In particular, the threshold management unit monitors the alerts triggered by components 28 in response to threshold violations, and the SLO violations reported by applications 24. In some cases the threshold management unit monitors the raw component metrics and application metrics as well.

The threshold management unit applies the accumulated information, using methods which will be explained below, to automatically adjust the values set to the component thresholds of components 28. Processor 38 typically sends the updated values via interface 40 to the respective components, and continues to monitor the system performance running with the updated thresholds. In some embodiments, unit 36 can be implemented as an add-on to an existing computer system, using existing component metrics and thresholds.

Typically, threshold management unit 36 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, unit 36 may be implemented in dedicated hardware logic, or using a combination of hardware and software elements. The threshold management unit may be a standalone unit, or it may alternatively be integrated with other computing platforms of system 20. For example, unit 36 can be implemented as part of system management module 32. Threshold management unit 36 and/or system management module 32 may be implemented as software processes running on one of the servers in system 20. Alternatively, threshold management unit 36 may be external to system 20, and it may be used to provide analysis and/or management services to system 20.

Automatic Threshold Setting Method

In many practical cases, it is desirable to set the component thresholds so that component threshold violations predict SLO violation events. For example, consider a database query service comprising a single SLO that states: "The average transaction processing time shall not exceed 2 seconds for 95% of the transactions." Assume that this exemplary database query service uses several components 28, including several disks. For one of these disks, the access time of writing a data page to the disk is defined as a component metric. A component threshold is defined over this metric, so that an alert is triggered if the access time exceeds the threshold value.

From the application's point of view it is desirable that the alert be triggered if, and only if, the disk access time is likely to cause a violation of the SLO. Setting the threshold too low may cause alerts to trigger when the disk access time is still acceptable, from the SLO perspective. This "false alarm" is commonly referred to as a "false positive" event. Setting the threshold too high, on the other hand, may cause the alert not to trigger when the SLO is violated. This "misdetection" is commonly referred to as a "false negative" event. Both events are typically undesirable. A high rate of false positive events may cause unnecessary alert processing in the system management module, and may result in unnecessary corrective actions, such as component replacements. A high rate of false negative events may cause failure to identify the root cause of the SLO violations, which may result in a degraded service level.

In principle, the automatic threshold setting methods described below tie together the statistical behavior of the application level SLOs and the component level thresholds. Using these methods, the threshold management unit automatically adjusts the component thresholds so as to achieve predetermined false positive and false negative rates, with respect to the SLO violations.

In some embodiments, the threshold management unit estimates the false positive and false negative rates by jointly monitoring threshold violations (in other words—triggered alerts) and SLO violations. For example, the threshold management unit can maintain the following table that describes the possible relations between threshold violations and SLO violations:

|  | SLO violated | SLO satisfied |
|---|---|---|
| Threshold violated | I | II |
| Threshold satisfied | III | IV |

In this example, the threshold management unit uses four counters denoted I, II, III and IV to count occurrences of the four possible combinations of SLO/threshold violations, over a given number of monitoring instances. Counter I counts events, in which a threshold violation coincided with an SLO violation. Counter II counts events, in which the threshold was violated but the SLO was not. Counter III counts events in which the SLO was violated but the threshold was not. Finally, counter IV counts events, in which neither the threshold nor the SLO were violated.

A Positive Predictive Value (PPV) of the threshold, with respect to the SLO, is defined as $PPV \equiv I/(I+II)$. The PPV represents the probability that the SLO is violated, given a violated threshold. A Negative Predictive Value (NPV) of the threshold, with respect to the SLO, is defined as $NPV \equiv IV/(III+IV)$. The NPV represents the probability that the SLO is not violated, given a non-violated threshold.

Many practical systems comprise multiple component thresholds and multiple SLOs, some of which may be interrelated. Any of these thresholds and SLOs can be satisfied or violated at any given time. In general, a particular SLO can be affected by any number of different component metrics. Similarly, a particular component metric may affect several SLOs in the system. For simplicity of explanation, the method descriptions that follow will assume a single system component 28 denoted c having a single component metric denoted $\mu$. A single component threshold denoted $\gamma$ is defined over metric $\mu$. A single SLO is defined for the system, over an application metric denoted $\rho$.

Generalization of the disclosed methods to computer systems comprising multiple SLOs and/or component thresholds is straightforward and will be apparent to those skilled in the art. Typically, the generalization of the methods involves identifying which of the multiple component metrics affect each SLO. Methods for identifying such interdependencies and identifying component metrics that are of minor importance to a particular SLO, such as dimensionality reduction methods, are known in the art.

In some systems, a particular SLO may not be reliably predicted using any single component threshold. In such cases, there may exist a combination of two or more component metrics, whose joint consideration may predict an SLO violation. This characteristic is referred to as "inseparability." In some embodiments, the threshold management unit may use statistical methods, such as methods used in data mining applications, to determine a linear combination of component metrics that reliably predicts an inseparable SLO.

In other cases, system 20 may comprise multiple applications that share the system components and services. These applications typically comprise SLOs that should be accommodated simultaneously. In some embodiments, a single statistical model can be used to model the SLO violations of all the applications. Alternatively, each application may comprise its own model. An intermediate solution is to classify the applications into classes, each class having a separate model. In one embodiment, a "case study" method can be used, as described by Agresti in "Categorical Data Analysis," John Wiley and Sons, Hoboken, N.J., 2002, which is incorporated herein by reference. Using this method, an empirical probability function is developed over time. The probability function predicts, for each component threshold violation, the type of application that may be affected by it. In some embodiments, the SLOs of the affected applications are combined to form a single composite SLO, and the threshold is adjusted in accordance with the composite SLO. In other embodiments, the affected SLOs remain separate, and a threshold value is defined for each SLO. In these embodiments, a vector of thresholds is typically maintained and separate alerts are generated for each application.

The following paragraphs describe a method, carried out by threshold management unit 36, for calculating a component threshold value that best predicts violations of a corresponding SLO. Three basic assumptions are made in the analysis. The first assumption is that the metrics $\mu$ and $\rho$ defined above are stochastically monotonic. Formally, this condition implies that $Pr(\rho1 \leq \rho2 | \mu1 \leq \mu2) > Pr(\rho1 > \rho2 | \mu1 \leq \mu2)$, wherein $Pr(\cdot)$ denotes a probability function. $\rho1$ and $\rho2$ denote the values of application metric $\rho$ at times t1 and t2, respectively. $\mu1$ and $\mu2$ denote the values of component performance metric $\mu$ at the same two time instances. A second assumption is that the SLO and component threshold are indeed interrelated, so that threshold violations are able to predict the SLO violations. For example, Breitgand et al. describe methods for extracting explicit relationships between system performance problems and component metrics in "Root-Cause Analysis of SAN Performance Problems: an I/O Path Affine Search Approach," Proceedings of the Ninth IFIP/IEEE International Symposium on Integrated Network Management, Nice, France, May 2005, which is incorporated herein by reference. A third underlying assumption is that the behavior of the system remains stochastically stationary for sufficiently long periods of time, so that the threshold has a sufficient number of iterations for converging. These three assumptions are typically met in the majority of practical applications.

In the description that follows, a discrete time model is assumed. In other words, the threshold management unit monitors SLO and threshold violations at discrete time instances denoted $\tau=0,1,\ldots,t$. The method uses the following definitions: $\Gamma(t)=\{\gamma(0), \gamma(1), \ldots, \gamma(t)\}$ at time denotes a time series of the values of threshold $\gamma$ at time instances $0, 1, \ldots, t$. $A(t)=\{a(0), a(1), \ldots, a(t)\}$ denotes a time series of binary stochastic variables describing SLO violations, wherein $a(\tau)=0$ if the SLO is satisfied at time instance $\tau$ and $a(\tau)=1$ if the SLO is violated at time instance $\tau$. $Y(t)=\{y(0), y(1), \ldots, y(t)\}$ denotes a time series of binary stochastic variables describing threshold violations, wherein $y(\tau)=0$ if threshold $\gamma$ is satisfied at time instance $\tau$ and $y(\tau)=1$ if threshold $\gamma$ is violated at time instance $\tau$. Let $\alpha$ and $\beta$ denote the desired PPV (the probability that the SLO is violated, given a violated threshold) and NPV (the probability that the SLO is satisfied, given a satisfied threshold) probabilities, respectively.

In some embodiments, the threshold management unit adjusts the desired value for threshold $\gamma$ so that the actual PPV and NPV of the system converge over time to the desired values $\alpha$ and $\beta$, respectively. Once this condition is satisfied, SLO violation events can be well predicted by threshold violation events.

The disclosed method constructs a statistical predictive model that uses the time series $\Gamma(t)$ and $A(t)$ to predict the future values of $Y(t)$. By solving a regression equation, as will be explained below, the model calculates the desired value of threshold $\gamma$ at the next time interval t+1, based on the historical values of the threshold (represented by $\Gamma(t)$) and on the history of SLO violations (represented by $A(t)$).

Since Y(t) and A(t) are binary variables, conventional linear regression methods are typically unsuitable for fitting these variables. There are, however, several methods known in the art for analyzing and fitting categorical (i.e., discrete) data. For example, a method called "logistic regression" is described in chapter 5, pages 165-197 of the Agresti reference cited above. Logistic regression is used for performing regression analysis of categorical data.

Figure 7:
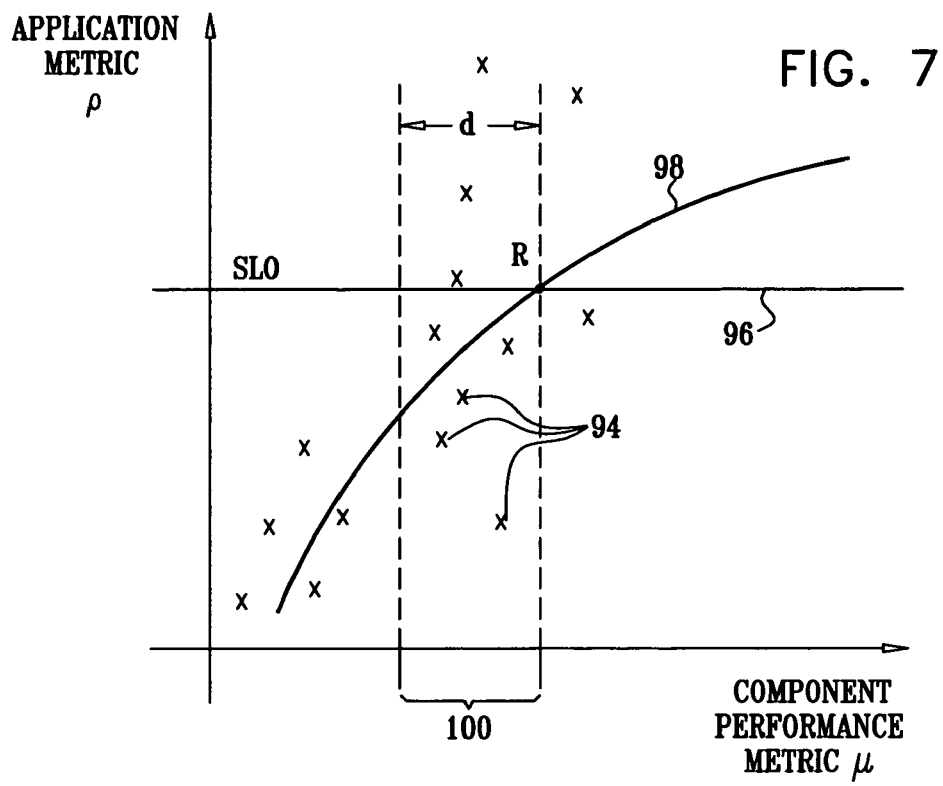
FIG. 7 is a plot that schematically illustrates a method for filtering application metric and component metric data points, in accordance with an embodiment of the present invention.

In some embodiments, the threshold management unit uses logistic regression for predicting γ(t+1) based on Y(t) and A(t). Alternatively, other methods for fitting categorical data can be used, such as additional methods described in the Agresti reference cited above. In some embodiments, the time series are filtered and/or assigned non-uniform weighting before the fitting process. An exemplary method for filtering the data and fitting the filtered data is shown in FIG. 7 below. Using the statistical model, the threshold management unit calculates the value of threshold γ for the next time interval, as will be explained below.

Figure 2:
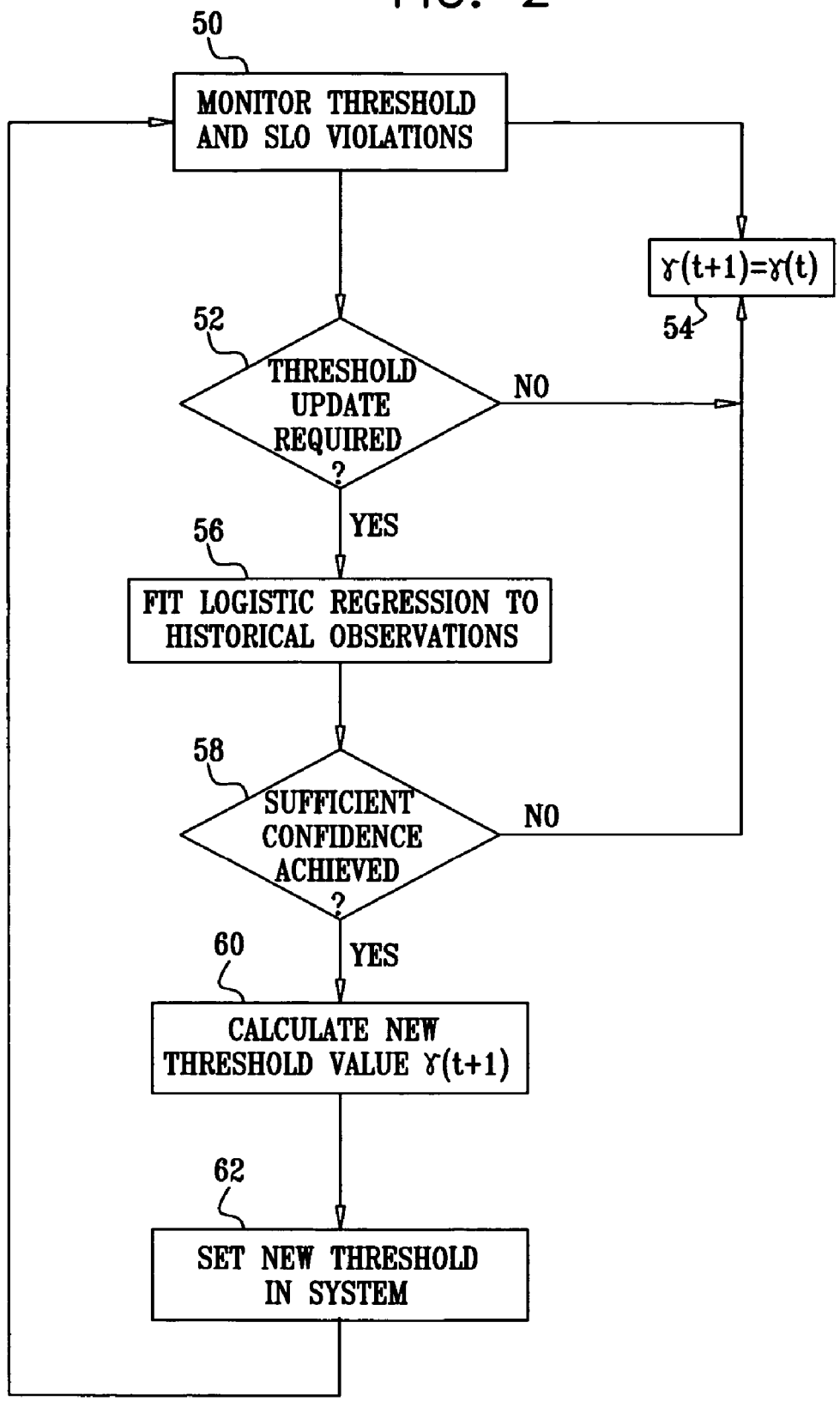
FIG. 2 is a flow chart that schematically illustrates a method for adaptive threshold setting, in accordance with an embodiment of the present invention.

FIG. 2 is a flow chart that schematically illustrates a method for adaptive threshold setting, carried out by threshold management unit 36, in accordance with an embodiment of the present invention. The method begins with unit 36 monitoring the behavior of system 20, at a monitoring step 50. In particular, the threshold management unit monitors threshold and SLO violations, and accumulates the measured time series Y(t) and A(t) described above. Unit 36 also records the time series of threshold values Γ(t). At the same time, the unit continually estimates the current PPV and NPV performance of threshold γ with respect to the SLO, as described above.

The threshold management unit checks whether an update to threshold γ is required, at an update checking step 52. Several alternative criteria can be used to determine whether a new threshold should be calculated. For example, in some embodiments a new threshold is calculated if the actual PPV or NPV of the threshold, as calculated in step 50 above, deviates from the desired value α or β. In another embodiment, the threshold management unit decides to update the threshold if a discrepancy is found between SLO and threshold violations (i.e., whenever the threshold is violated when the SLO is satisfied, and vice versa). The threshold management unit can also use different combinations of such criteria. Alternatively, any other suitable criterion can be used. In some cases, two or more such criteria are used in sequence, so as to reduce the computational complexity of update checking step 52.

If the result of update checking step 52 is negative, indicating no update is required, the threshold management unit maintains the existing threshold value for the next monitoring interval, at a threshold maintaining step 54. The threshold management unit updates time series Γ(t) so that γ(t+1)=γ(t). The method then returns to monitoring step 50 and the threshold management unit continues to monitor the system.

If, on the other hand, the outcome of update checking step 52 is positive, indicating a required threshold update, the threshold management unit performs a fitting of the historical time series, using logistic regression, at a fitting step 56. The logistic regression process performed by the unit 36 follows the methods described in chapter 5 of the Agresti reference cited above. Based on the historical time series Y(t), the threshold management unit estimates the probability $$p(\vec{x}) = P(Y=1 | \vec{X}=\vec{x}) = 1 - P(Y=0 | \vec{X}=\vec{x}) \qquad [1]$$

which is the probability that y(t+1)=1 (threshold violated at time t+1) given the historical time series Γ(t) and A(t). ($\vec{X}$ denotes the vector of explanatory variables, in the present case comprising Γ(t) and A(t).) Since Y(t) is a vector of observations of binary stochastic variables, it is typically represented as a vector of 1's and 0's. $p(\vec{x})$ can thus be estimated by counting the number of 1's in vector Y(t) and dividing the result by the length of the vector.

The processor then calculates the value of the logistic regression function $$\log it(p(\vec{x})) = \ln \frac{p(\vec{x})}{1 - p(\vec{x})}, \qquad [2]$$

as defined in the Agresti reference, cited above. Using this value, the threshold management unit calculates the linear regression between logit($p(\vec{x})$) and $\vec{x}$, given by $$\log it(p(\vec{x})) = c + \vec{b} \cdot \vec{x} \qquad [3]$$

The values of regression coefficients c and $\vec{b}$ are derived from the regression calculation, typically using a maximum-likelihood estimation. This process is well known in the art. As noted above, alternative fitting methods can also be used, such as the method shown in FIG. 7 below.

After performing the logistic regression, the threshold management unit evaluates the quality of the fit achieved by fitting step 56, at a confidence checking step 58. In one embodiment, the unit uses a double log likelihood (−2LL) test, which is well known in the art. The −2LL test is described, for example, by Kleinbaum and Klein in "Logistic Regression, a Self-Learning Text," Springer Verlag, Second edition, July 2002, chapter 5, page 130. Alternatively, any other suitable method for quantifying the quality of the fit can be used to implement confidence checking step 58. Typically, the quality or confidence of the fit is compared with a predetermined confidence level. If the quality of the fit is insufficient, the method returns to step 54 without changing the threshold value.

If the quality of the logistic regression fit achieved by fitting step 56 is sufficient, the threshold management unit uses this fit to calculate an updated value for threshold γ, at a threshold calculation step 60. Equation [3] above can be written as $$p(\vec{x}) = \frac{1}{1 + e^{(-c - \vec{b} \cdot \vec{x})}} \qquad [4]$$

Since in the present case the explanatory variables are x1≡a(t) and x2≡γ(t), equation [4] can be written as $$p(t+1) = \frac{1}{1 + e^{(-c - b_1 \cdot a(t+1) - b_2 \cdot \gamma(t+1))}} \qquad [5]$$

If the SLO is violated at time t+1, then a(t+1)=1, and equation [5] can be written as $$p(t+1) = \frac{1}{1 + e^{(-c - b_1 - b_2 \cdot \gamma(t+1))}} \qquad [6]$$

It can be shown that as t→∞, p(t+1)→PPV. If, on the other hand, the SLO is satisfied at time t+1, then a(t+1)=0, and equation [5] can be written as $$p(t+1) = \frac{1}{1 + e^{(-c - b_2 \cdot \gamma(t+1))}} \qquad [7]$$

It can be similarly shown that as $t \to \infty$, $1-p(t+1) \to \text{NPV}$.

Given the two relations given in equations [6] and [7] above, and the desired PPV and NPV values $\alpha$ and $\beta$, the value of threshold $\gamma$ at time $t+1$ can be predicted by solving equation [6] for $\gamma(t+1)$ as follows $$\gamma(t+1) = [\ln(\alpha/(1-\alpha)) - c - b_1]/b_2$$

The current NPV (denoted $\beta'$) is then calculated using equation [7] and can be compared with the desired NPV value $\beta$. Using the desired PPV $\alpha$ and the attained current NPV $\beta'$ yields:

$$\gamma(t+1) = \frac{\ln\frac{\alpha}{1-\alpha} - \ln\frac{\beta'}{1-\beta'} - 2 \cdot c - b_1}{2 \cdot b_2} \qquad [8]$$

The threshold management unit thus calculates the updated value $\gamma(t+1)$ using the above equations, based on the desired PPV and current NPV values $\alpha$ and $\beta'$, and on the regression coefficients $b_1$, $b_2$ and $c$, derived by the logistic regression process at fitting step 56.

Having calculated the new threshold $\gamma(t+1)$, the threshold management unit sets this value in the system, at a threshold setting step 62. The method then loops back to monitoring step 50. The threshold management unit continues to monitor the system, which now operates with the updated threshold. In the subsequent iteration of monitoring step 50, the threshold management unit augments time series $\Gamma(t)$, $Y(t)$ and $A(t)$ with the newly-calculated threshold $\gamma(t+1)$ and the new observations of the threshold and SLO violations, respectively. In the subsequent iteration of fitting step 56, the threshold management unit derives new values of $c$, $b_1$ and $b_2$ using a logistic regression on the updated time series. The process continues iteratively in this manner. Using the iterative threshold setting method described above, the actual PPV and NPV values of the threshold $\gamma$ with respect to the SLO gradually converge to the desired values $\alpha$ and $\beta$, respectively.

An exemplary flow of the method described in FIG. 2 is given by the following pseudo-code (wherein ATS stands for Automatic Threshold Setting. The symbol $\Sigma$ denotes the required confidence level. $\alpha$ and $\beta$ are set to predetermined values, such as $\alpha$=0.95, $\beta$=0.85. The symbols $\wedge$, $\vee$ and $\neg$ denote the logical disjunction, conjunction and negation operators, respectively.)

```
1.  ATS (α, β, Σ) {
2.  initialize γ(0)                         //Set to a random value,
                                            unless a default value is
                                            known.
3.  while (TRUE) {                          //main event loop
4.      given SLO observation at time t, do { //event
                                                arrived
5.          boolean v ← isViolated(SLO)
6.          if ((v∧(μ(t)<γ(t)))∨(¬v∧(μ(t)>γ(t))))
7.              if ((current PPV<α)∨(current NPV<β)) {
8.                  fit logistic regression.
9.                  if Σ was achieved (use -2LL to test)
10.                     compute γ(t+1)
11.             }
12.         else
13.                     γ(t+1) ← γ(t)
14.     }//end: do
15.     }//end: while (main loop)
16. }//end: ATS
```

As can be seen from equation [8] above, the value of $\gamma(t+1)$ implicitly depends on the previous values $\gamma(0), \gamma(1), \ldots, \gamma(t)$. The dependence is carried through the regression coefficients $b_1$, $b_2$ and $c$, which are derived from the previous iteration of fitting the historical threshold values. In some cases, this dependence may introduce a bias into the regression model, which typically slows its convergence and introduces an error into the resulting threshold values. To overcome this bias effect, in some embodiments the threshold management unit inserts dummy data points into time series $\Gamma(t)$ before performing fitting step 56. The dummy data points are typically interleaved with the real threshold values. In one embodiment, the dummy values are generated at random, using a uniform distribution, from the range [max($\bar{\mu}-3\sigma$, 0), $\bar{\mu}+3\sigma$], wherein $\bar{\mu}$ denotes the sample mean of metric $\mu$, and $\sigma$ denotes the sample variance of the metric. Other suitable distribution functions can also be used. The introduction of the dummy points into the calculation helps to reduce the bias and improves the model fit.

In some embodiments, some of the data points of time series $A(t)$ and $Y(t)$ are given different weights, in order to improve the fitting accuracy in the logistic regression. For example, data points corresponding to older observations may be given lower weight in comparison to more recent data points. In another exemplary scenario, SLOs and metrics of some systems exhibit periodic behavior corresponding to certain hours in a day or days in a month. Such periodic behavior is described, for example, in the Burgess paper cited above. Assigning weights in accordance with such repetitive patterns can also improve the model fit.

Experimental Setup

The inventors have implemented the adaptive threshold setting method described above using an experimental SAN system.

Figure 3:
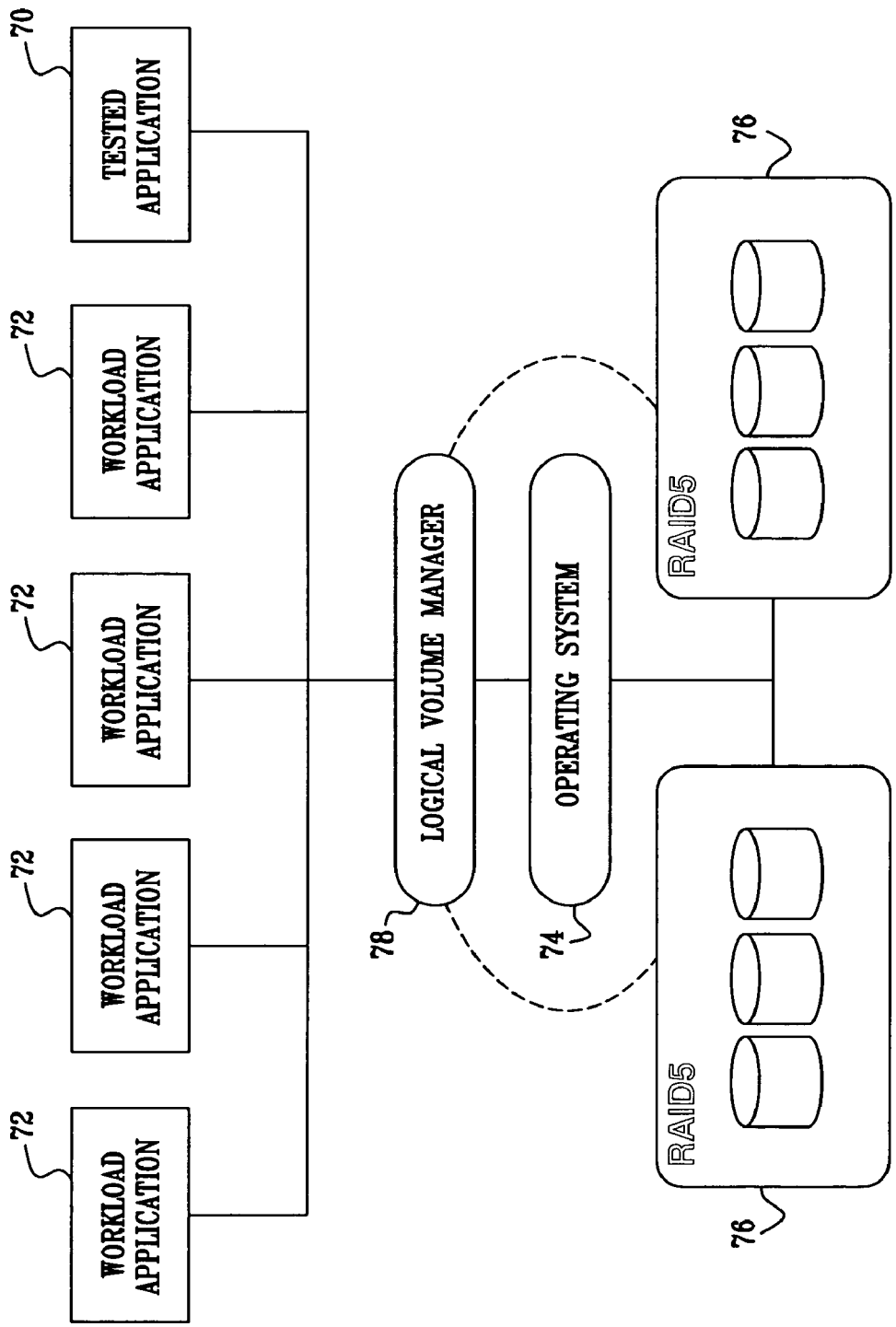
FIG. 3 is a block diagram that schematically illustrates an experimental setup, in accordance with an embodiment of the present invention.

FIG. 3 is a block diagram that schematically illustrates the experimental setup, in accordance with an embodiment of the present invention. The experimental system comprises a tested application 70 and multiple workload applications 72. The workload applications were used to generate Input-Output (I/O) transactions and load the system. Applications 70 and 72 were simulated using conventional I/O benchmark software tools, namely Iometer and Iozone.

Applications 70 and 72 run on a workstation running under a Windows 2000™ operating system 74. The applications consumed I/O services from a Redundant Array of Independent Disks (RAID) disk array 76 through a Logical Volume Manager (LVM) 78 produced by Veritas Software Corporation (Mountain View, Calif.).

A component metric $\mu$ and a corresponding threshold $\gamma$ were defined for one of the logical disk volumes, measuring the response time of the logical volume. An application metric $\rho$ measured the response time of the tested application. An SLO was defined over $\rho$ specifying the maximum allowable response time for a storage transaction.

Approximately 190,000 data points were measured for the component metric using LVM 78, and 375 data points were measured for the application metric. The data was then analyzed using a MATLAB™ program that implemented the method described in FIG. 2 above. Each application metric measurement was paired with the corresponding component metric measurement. The data pairs were classified as being either false-positive, false-negative, true-positive or true-negative events. If either a false-positive or a false-negative event was detected, and the target PPV or NPV values were not satisfied at a particular time instance, a new component threshold was calculated, based on the data points preceding this time instance. The threshold calculation followed the method described in FIG. 2 above. A target confidence level of $\Sigma=0.95$ was used in the logistic regression fitting. If such a confidence value was not attained, the threshold was reset to a random value, ignoring the historical values.

FIG. 4 is a plot that schematically illustrates the application metric and component metric behavior, in accordance with an embodiment of the present invention. Data points 80 show the logical volume (LV) response time (i.e., the component metric $\mu$). Data points 82 show the corresponding response time of the application (i.e., the application metric $\rho$). Data points 80 exhibit a layered behavior, which implies the existence of several different modes of system behavior that do not necessarily cause SLO violation. In other words, the component metric value does not explicitly predict the SLO violations. This observation demonstrates the importance of adaptive threshold setting. It can also be observed that the application and component metrics are stochastically monotonic, since high values of data points 80 typically coincide with high values of data points 82.

FIG. 5 is a scatter plot that schematically illustrates the application metric and a component metric behavior, in accordance with another embodiment of the present invention. FIG. 5 shows the application metric $\rho$ (the application response time) plotted against the variance of the logical volume response time. Examining FIGS. 4 and 5, it can be appreciated that the application metric has a more structured and distinct dependence on the variance of the LV response time than on the raw LV response time. This dependence implies that using the variance of the LV response time as a component metric, rather than the response time itself, is a better choice for predicting SLO violations.

FIG. 6 is a plot that schematically illustrates a component metric and a component threshold, in accordance with an embodiment of the present invention. Data points 86 show the variance of the LV response time, plotted against time. Comparing data points 86 to data points 80 of FIG. 4, it can be seen that the variance of the LV response time is indeed a better component metric, exhibiting less noise and better structure.

A plot 88 shows the values assigned to threshold $\gamma$ by the adaptive threshold setting process. The SLO definition in this example regarded any application response time greater than 1700 ms an SLO violation. (Using this value, approximately 40% of the data points correspond to SLO violations.) Plot 88 shows several intervals in which the threshold value does not change, since the exemplary simulation calculates a new threshold only when a false-positive or false-negative event is detected and the PPV/NPV values deviate from the specified target values.

Using the LV response time as a component metric, PPV levels of approximately 89% and NPV levels of approximately 91% were achieved. Higher PPV values could be reached at the expense of degraded NPV, and vice versa. Using the variance of the LV response time as the metric, the achievable PPV was improved to approximately 93%.

The threshold adaptation rate was also measured. Typically, the threshold converged to its final value in approximately 10 iterations. These exemplary tests demonstrate the effectiveness of the disclosed method in automatically and adaptively setting the component threshold to values that closely predict SLO violation events.

Weighting and Filtering of Events

In some practical scenarios, the accuracy of the logistic regression fitting process can be improved by considering several additional factors:
  Some historical events are often less relevant than others to the prediction. Assigning a higher weight to meaningful events can improve the fit.
  In some cases, relatively rare events, such as extreme SLO violations, can provide valuable insight to the operation of the system and should not be ignored or averaged-out by the regression process.
  The quantitative value of SLO and component threshold violations (as opposed to the binary information—violated/satisfied) often carries valuable information that can be used.
  Events in which an SLO is almost violated are often meaningful and can be used to improve the prediction.

Some applications use pre-correction and weighting techniques in order to take these factors into account. For example, Tomz et al. describe such methods in "Logistic Regression in Rare Events Data," Journal of Computational and Graphical Statistics, (12:1), March 2003, pages 246-247, which is incorporated herein by reference.

FIG. 7 is a plot that schematically illustrates an exemplary method for filtering application metric and component metric data points, in accordance with an embodiment of the present invention. Data points 94 represent correlated application metric and component metric observations, as described above. The data points are plotted in a two-dimensional coordinate system, in which the horizontal axis corresponds to the value of the component metric, and the vertical axis corresponds to the value of the application metric. A horizontal SLO line 96 represents the application metric value regarded as SLO violation threshold.

In some embodiments, the threshold management unit performs an alternative implementation of fitting step 56 of the method of FIG. 2 above. Instead of using logistic regression, the threshold management unit fits a quadratic polynomial to the ensemble of data points 94. In general, a quadratic polynomial fit more easily accommodates rare, widely deviating events than a linear fit. A curve 98 shows -the best-fit quadratic polynomial. The polynomial intersects SLO line 96 at an intersection point denoted "R" in the figure. A filtering interval 100 having a predetermined size denoted "d" is defined, so that the interval ends at intersection point R.

The threshold management unit selects a sub-set of the data points whose horizontal coordinate (i.e., their component metric value) falls within the filtering interval. The threshold management unit then calculates the updated threshold value, in accordance with the fitted polynomial. In this embodiment, however, only the selected sub-set of data points is used in the calculation. The selection is made so that the filtering interval comprises data points that are relatively close to the SLO violation threshold. Typically, some of these data points are located above line 96, corresponding to SLO violations. The remaining data points correspond to normal system behavior, although some of them typically correspond to "near SLO violations." The selection process thus implicitly weights and filters the data points.

Direct Threshold Setting

Figure 8:
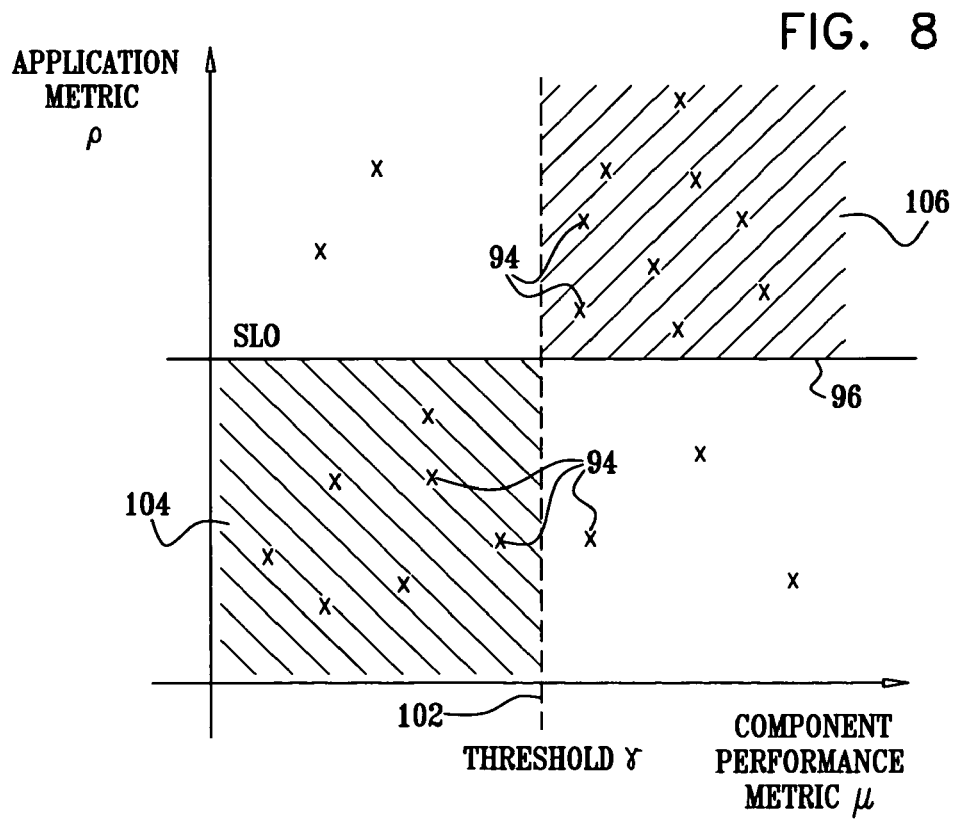
FIG. 8 is a plot that schematically illustrates an alternative method for setting a threshold, in accordance with an embodiment of the present invention.

FIG. 8 is a plot that schematically illustrates an alternative method for setting a threshold, in accordance with an embodiment of the present invention. The historical events of system 20 are plotted as data points 94, using the same coordinate system as FIG. 7 above. SLO line 96 marks the threshold value of application metric p that is regarded as an SLO violation. The component threshold γ is represented as a vertical line 102. Lines 96 and 102 divide the two-dimensional plane into four quadrants. It can be seen that the data points located in a quadrant 104 correspond to true negative events (i.e., events in which both the component threshold and the SLO are satisfied). Similarly, the data points located in a quadrant 106 correspond to true positive events, or events in which both the component threshold and the SLO are violated. The remaining two quadrants correspond to the false-positive and false-negative events.

Using this representation, the threshold management unit can search for the optimal value of threshold γ. In one embodiment, the unit searches for the location of line 102 that maximizes the number of data points in quadrants 104 and 106, and minimizes the number of data points in the remaining quadrants. In other words, the threshold value maximizes the combined number of true-positive and true-negative events, while minimizing the number of false-positive and false-negative events at the same time. Heuristically, a threshold value that satisfies this condition is a good predictor of SLO violations.

In another embodiment, the threshold can use the representation of FIG. 8 to estimate the PPV and NPV values of the system. The PPV value can be estimated by dividing the number of data points 94 in quadrant 106 by the total number of data points on the right hand side of threshold line 102. Similarly, the NPV of the system can be estimated by dividing the number of data points 94 in quadrant 104 by the total number of data points on the left hand side of threshold line 102. These estimates can be used by the threshold management unit to optimize the value of threshold γ with respect to the rate of true-positive and true-negative events. In these embodiments, the threshold management unit can use an exhaustive search strategy, or any other suitable search method.

Although the embodiments described above relate, by way of example, to faults in a computer system, the principles of the present invention may similarly be applied to other systems in which component performance is monitored and managed using metrics and thresholds. Such systems may comprise, for example, medical systems, industrial systems, communication systems and others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
in a computer system that includes at least one component having a performance threshold, transmitting alerts from the computer system to a monitoring system when a performance measure of the at least one component crosses the performance threshold;
detecting, using the monitoring system, violations of a Service Level Objective (SLO) defined for a service running on the computer system;
based on the alerts transmitted to the monitoring system when the performance threshold is crossed, producing a model that predicts future violations of the SLO responsively to the alerts and has a prediction reliability; and
automatically adjusting the performance threshold of the component responsively to the model,
wherein producing the model comprises fitting a first sequence comprising historical values of the violations of the SLO and a second sequence comprising historical values of the performance threshold, and wherein automatically adjusting the performance threshold of the component comprises calculating an updated threshold value based on the fitted sequences and a pre-specified prediction reliability.

2. The method according to claim 1, wherein fitting the first and second sequences comprises applying at least one of a logistic regression process and a polynomial fitting process.

3. The method according to claim 1, wherein producing the model comprises estimating a fitting quality responsively to the model and the first and second sequences, and wherein automatically adjusting the threshold comprises determining whether to update the threshold responsively to the fitting quality.

4. The method according to claim 1, wherein fitting the first and second sequences comprises inserting dummy data points into the first and second sequences, so as to reduce a bias in the calculated updated threshold value.

5. The method according to claim 1, wherein fitting the first and second sequences comprises using only a part of the historical values in the first and second sequences corresponding to at least one of recent events, periodic events and events in which a performance metric value is within a predetermined interval.

6. The method according to claim 1, wherein fitting the first and second sequences comprises applying weights to at least some of the historical values corresponding to at least one of recent events, periodic events, rare events and events in which a performance metric value is within a predetermined interval.

7. Apparatus for managing a computer system that includes at least one component having a performance threshold, the apparatus comprising:
an interface, which is coupled to receive from the computer system alerts when the performance measure of the at least one component crosses the performance threshold, and to further receive from the computer system detected violations of a Service Level Objective (SLO) defined for a service running on the computer system; and
a processor, which is arranged to produce, based on the alerts received from the computer system when the performance threshold is crossed, a model that predicts future violations of the SLO responsively to the alerts and has a prediction reliability, and to automatically adjust the performance threshold of the component responsively to the model,
wherein the processor is arranged to fit a first sequence comprising historical values of the violations of the SLO and a second sequence comprising historical values of the performance threshold in order to produce the model, and to calculate an updated threshold value based on the fitted sequences and a pre-specified prediction reliability.

8. The apparatus according to claim 7, wherein the processor is arranged to apply at least one of a logistic regression process and a polynomial fitting process in order to fit the first and second sequences.

9. The apparatus according to claim 7, wherein the processor is arranged to estimate a fitting quality responsively to the model and the first and second sequences, and to determine whether to update the threshold responsively to the fitting quality.

10. The apparatus according to claim 7, wherein the processor is arranged to insert dummy data points into the first and second sequences when producing the model, so as to reduce a bias in the calculated updated threshold value.

11. The apparatus according to claim 7, wherein the processor is arranged to produce the model using only a part of the historical values in the first and second sequences corresponding to at least one of recent events, periodic events and events in which a performance metric value is within a predetermined interval.

12. The apparatus according to claim 7, wherein the processor is arranged to apply weights to at least some of the historical values corresponding to at least one of recent events, periodic events, rare events and events in which a performance metric value is within a predetermined interval.

13. A method, comprising:
in a computer system that includes at least one component having a performance threshold, transmitting alerts from the computer system to a monitoring system when a performance measure of the at least one component crosses the performance threshold;
detecting, using the monitoring system, violations of a Service Level Objective (SLO) defined for a service running on the computer system;
based on the alerts transmitted to the monitoring system when the performance threshold is crossed, producing a model that predicts future violations of the SLO responsively to the alerts and has a prediction reliability; and
automatically adjusting the performance threshold of the component responsively to the model,
wherein producing the model comprises assigning a first counter to count a first number of occurrences in which the performance threshold is crossed, a second counter to count a second number of the occurrences in which the performance threshold is not crossed, a third counter to count a third number of the occurrences in which the SLO is violated, and a fourth counter to count a fourth number of the occurrences in which the SLO is not violated, and wherein adjusting the performance threshold comprises setting the performance threshold responsively to the first, second, third and fourth counters.

14. The method according to claim 13, wherein the computer system comprises a Storage Area Network (SAN).

15. The method according to claim 13, wherein producing the model comprises estimating false-positive and false-negative rates of the alerts with respect to the violations of the SLO.

16. The method according to claim 15, wherein automatically adjusting the threshold comprises causing the estimated false-positive and false-negative rates to converge to predetermined target values.

17. The method according to claim 15, wherein automatically adjusting the threshold comprises searching for a threshold value that minimizes the estimated false-positive and false-negative rates.

18. Apparatus for managing a computer system that includes at least one component having a performance threshold, the apparatus comprising:

an interface, which is coupled to receive from the computer system alerts when the performance measure of the at least one component crosses the performance threshold, and to further receive from the computer system detected violations of a Service Level Objective (SLO) defined for a service running on the computer system; and a processor, which is arranged to produce, based on the alerts received from the computer system when the performance threshold is crossed, a model that predicts future violations of the SLO responsively to the alerts and has a prediction reliability, and to automatically adjust the performance threshold of the component responsively to the model,
wherein the processor is arranged to produce the model by assigning a first counter to count a first number of occurrences in which the performance threshold is crossed, a second counter to count a second number of the occurrences in which the performance threshold is not crossed, a third counter to count a third number of the occurrences in which the SLO is violated, and a fourth counter to count a fourth number of the occurrences in which the SLO is not violated, and to adjust the performance threshold responsively to the first, second, third and fourth counters.

19. The apparatus according to claim 18, wherein the computer system comprises a Storage Area Network (SAN).

20. The apparatus according to claim 18, wherein the processor is arranged to estimate false-positive and false-negative rates of the alerts with respect to the violations of the SLO.

21. The apparatus according to claim 20, wherein the processor is arranged to adjust the threshold so as to cause the estimated false-positive and false-negative rates to converge to predetermined target values.

22. The apparatus according to claim 20, wherein the processor is arranged to search for a threshold value that minimizes the estimated false-positive and false-negative rates.

23. A method for performing an interactive analysis of a computer system, which includes at least one component having a performance threshold, to devise an information technology solution applicable to the computer system, the method comprising:
transmitting alerts from the computer system to a monitoring system when a performance measure of the at least one component crosses the performance threshold;
detecting, using the monitoring system, violations of a Service Level Objective (SLO) defined for a service running on the computer system;
based on the alerts transmitted to the monitoring system when the performance threshold is crossed, producing a model that predicts future violations of the SLO responsively to the alerts and has a prediction reliability; and
automatically adjusting the performance threshold of the component responsively to the model,
wherein producing the model comprises fitting a first sequence comprising historical values of the violations of the SLO and a second sequence comprising historical values of the performance threshold, and wherein automatically adjusting the performance threshold of the component comprises calculating an updated threshold value based on the fitted sequences and a pre-specified prediction reliability.

24. The method according to claim 23, wherein the computer system comprises a Storage Area Network (SAN).

25. The method according to claim 23, wherein producing the model comprises estimating false-positive and false-negative rates of the alerts with respect to the violations of the SLO, and wherein automatically adjusting the performance threshold comprises causing the estimated false-positive and false-negative rates to converge to predetermined target values.

26. The method according to claim 25, wherein automatically adjusting the threshold comprises searching for a threshold value that minimizes the estimated false-positive and false-negative rates.

* * * * *